(12) United States Patent
Fay et al.

(10) Patent No.: US 11,647,178 B2
(45) Date of Patent: May 9, 2023

(54) DIGITAL TELEVISION RENDERING VERIFICATION

(71) Applicant: Sony Corporation, Tokyo (JP)

(72) Inventors: Luke Fay, San Diego, CA (US); Tanmay Agnihotri, San Diego, CA (US)

(73) Assignee: Sony Corporation, Tokyo (JP)

( * ) Notice: Subject to any disclaimer, the term of this patent is extended or adjusted under 35 U.S.C. 154(b) by 449 days.

(21) Appl. No.: 16/785,493

(22) Filed: Feb. 7, 2020

(65) Prior Publication Data

US 2021/0250573 A1 Aug. 12, 2021

(51) Int. Cl.
*H04N 17/00* (2006.01)
*H04N 17/04* (2006.01)
*H04N 21/24* (2011.01)
*H04N 21/254* (2011.01)
*H04N 21/643* (2011.01)

(52) U.S. Cl.
CPC .......... *H04N 17/004* (2013.01); *H04N 17/04* (2013.01); *H04N 21/24* (2013.01); *H04N 21/2541* (2013.01); *H04N 21/643* (2013.01)

(58) Field of Classification Search
CPC ............ H04N 21/482; H04N 21/4383; H04N 21/4384; H04N 7/002; H04N 17/004; H04N 17/04; H04N 17/045
See application file for complete search history.

(56) References Cited

U.S. PATENT DOCUMENTS

| | | | |
|---|---|---|---|
| 6,643,816 B1* | 11/2003 | Uesugi | H04L 1/1835 370/252 |
| 9,986,301 B2* | 5/2018 | Lee | H04N 21/2381 |
| 10,116,997 B2* | 10/2018 | Rhyu | H04N 21/4307 |
| 10,715,860 B1* | 7/2020 | Bartlett | H04N 21/4312 |
| 2003/0229900 A1* | 12/2003 | Reisman | H04N 21/42204 725/87 |
| 2008/0189580 A1* | 8/2008 | Kim | H04N 17/04 714/712 |
| 2008/0199056 A1* | 8/2008 | Tokuse | G06K 9/00295 382/118 |
| 2010/0057405 A1* | 3/2010 | Wu | G06F 11/2268 702/187 |
| 2011/0099579 A1* | 4/2011 | Kim | H04N 21/4345 725/44 |
| 2012/0102462 A1* | 4/2012 | Kushneryk | G06F 11/3688 717/124 |

(Continued)

OTHER PUBLICATIONS

"RFC 4033, DNS Security Introduction and Requirements," Arends, R., Austein, R., Larson, M., Massey, D., and S. Rose, Internet Engineering Task Force, Fremont CA, Mar. 2005.

(Continued)

*Primary Examiner* — John W Miller
*Assistant Examiner* — Humam M Satti
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. Test code is embedded in ATSC 3.0 content to determine whether a receiver can render the content. The results are reported back to the broadcaster, which can alter content or perform other modifications based on aggregated rendering statistics.

20 Claims, 5 Drawing Sheets

(56) References Cited

U.S. PATENT DOCUMENTS

| | | | | |
|---|---|---|---|---|
| 2012/0174163 | A1* | 7/2012 | Moorthy | H04N 21/42638 725/56 |
| 2013/0298177 | A1* | 11/2013 | Rhyu | H04N 21/234 725/110 |
| 2014/0368665 | A1* | 12/2014 | Lirette | H04N 21/6543 348/180 |
| 2016/0080243 | A1* | 3/2016 | Kodama | H04L 43/16 370/252 |
| 2016/0360014 | A1* | 12/2016 | Kwak | H04L 65/4076 |
| 2017/0099523 | A1* | 4/2017 | Kwak | H04N 21/25808 |
| 2018/0115796 | A1* | 4/2018 | Yang | H04N 21/4126 |
| 2018/0176278 | A1* | 6/2018 | Mandyam | H04L 65/70 |
| 2019/0166392 | A1* | 5/2019 | Eyer | H04N 21/4784 |
| 2019/0373302 | A1* | 12/2019 | Moon | H04N 21/4722 |
| 2020/0077159 | A1* | 3/2020 | Deshpande | H04N 21/643 |
| 2020/0344498 | A1* | 10/2020 | Lazar | H04N 21/44 |
| 2020/0366947 | A1* | 11/2020 | Lee | H04N 21/8586 |
| 2021/0125569 | A1* | 4/2021 | Mori | G09G 3/3406 |
| 2022/0014292 | A1* | 1/2022 | Choi | H04H 60/372 |

OTHER PUBLICATIONS

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.

"ATSC Standard: ATSC 3.0 Interactive Content (A/344)", May 2, 2019.

"ATSC Standard: ATSC 3.0 Security and Service Protection", Aug. 20, 2019.

"ATSC Standard: ATSC 3.0 System", Sep. 17, 2019.

"ATSC Standard: Signaling, Delivery, Synchronization, and Error Protection (A/331)", Jun. 19, 2019.

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.

"RFC 5289, TLS Elliptic Curve Cipher Suites with SHA-256/384 and AES Galois Counter Mode (GCM)," E. Rescoria, Internet Engineering Task Force, Fremont, CA, Aug. 2008.

"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.

"RFC 5753, Use of Elliptic Curve Cryptography (ECC) Algorithms in Cryptographic Message Syntax (CMS)," S. Turner, O. Brown, Internet Engineering Task Force, Fremont, CA, Jan. 2010.

"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.

"RFC 5940, Additional Cryptographic Message Syntax (CMS) Revocation Information Choices," S. Turner, R. Housley, Internet Engineering Task Force, Fremont, CA, Aug. 2010.

"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.

"RFC 5019, The Lightweight Online Certificate Status Protocol (OCSP) Profile for High-Volume Environments," A. Deacon, R. Hurst, Internet Engineering Task Force, Fremont, CA, Sep. 2007.

* cited by examiner

DIGITAL TELEVISION RENDERING VERIFICATION

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, it is desirable to ensure that a receiver can properly render ATSC 3.0 content in accordance with the appropriate ATSC 3.0 standard, e.g., in accordance with A/344 (referencing Consume Technology Association (CTA) 5000). This is to eliminate or limit rogue devices that otherwise might receive ATSC 3.0 content and redistribute it in ways that would deprive intended beneficiaries of revenue.

Accordingly, a digital television system includes at least one receiver with at least one processor programmed with instructions to configure the processor to receive from broadcaster equipment a test application, and to execute the test application. The instructions are executable to implement an application programming interface (API) associated with hypertext markup language (HTML) Entry pages Location Description (HELD) signaling for logging commands to and responses from a device under test. The instructions also are executable to, based at least in part on the HELD signaling, load at least one entry page from at least one web server onto at least one browser of the receiver, and using the test application, execute API calls to exercise compliance with a standard.

The test application is a specialized broadcaster application that self-generates commands as part of a rendering test. The test application self-generates commands to send, such as but not limited to channel change commands, and monitors for correct feedback, e.g., correct channel change. Essentially the test application in the receiver device under test executes a test script.

In some example implementations, the instructions can be executable to execute the test application to exercise at least one connection to at least one WebSocket Server, at least one hypertext transfer protocol (HTTP) interface, and reception of the HELD signaling.

In non-limiting embodiments, the instructions may be executable to execute the test application to test support of a user agent of the receiver for at least one web browser using reception of the HELD signaling at least on part by sending a signal back through a hypertext transfer protocol (HTTP) interface to a test computer.

If desired, the instructions can be executable to execute the test application to test for proper HELD signaling at least in part by sending a 'hello' signal back to the broadcaster equipment. In example embodiments the instructions may be executable to execute the test application to test for proper HELD signaling at least in part by maintaining in storage of the receiver a 'hello' signal. Moreover, in some implementations the instructions are executable to execute the test application to identify proper execution of APIs of at least one WebSocket of the receiver connected to at least one web socket server.

In an example, at least one and in some non-limiting embodiments one and only one test application is executed by the processor and the instructions are executable to use the one and only one test application to execute a first API command associated with a first broadcast channel and execute a second API command associated with a second broadcast channel to identify execution of a request to change tuning from the first broadcast channel to the second broadcast channel.

In another aspect, a digital television system includes at least one receiver configured to receive digital television from at least one transmitter assembly. The receiver includes at least one processor programmed with instructions to execute at least a first broadcaster application to access test code in at least a first service, identify, based at least in part on the test code, whether the receiver renders content, and transmit a signal to the transmitter assembly indicating whether the receiver renders the content.

The test code may include, for example, cascading style sheet (CSS) code. The test code may include a command to change service from a first service to a second service, and the instructions can be executable to use a first application programming interface (API) command in rendering the first service and a second API command in rendering the second service.

In another aspect, in a digital television system, a method includes executing at least a first broadcaster application to access test code in at least a first service provided to a receiver. The method also includes identifying, based at least in part on the test code, whether the receiver renders content, and transmitting a signal to a transmitter assembly indicating whether the receiver renders the content.

The details of the present application, both as to its structure and operation, can best be understood in reference to the accompanying drawings, in which like reference numerals refer to like parts, and in which:

DETAILED DESCRIPTION

Figure 1:
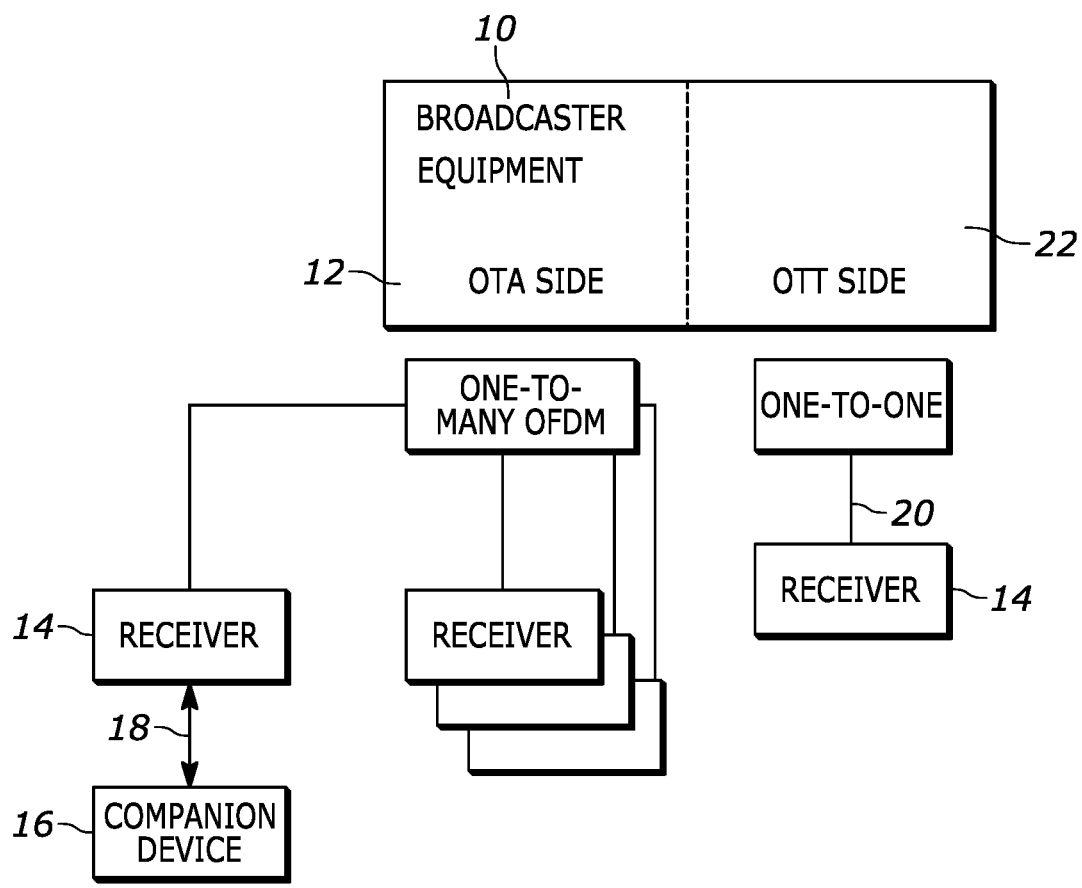
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
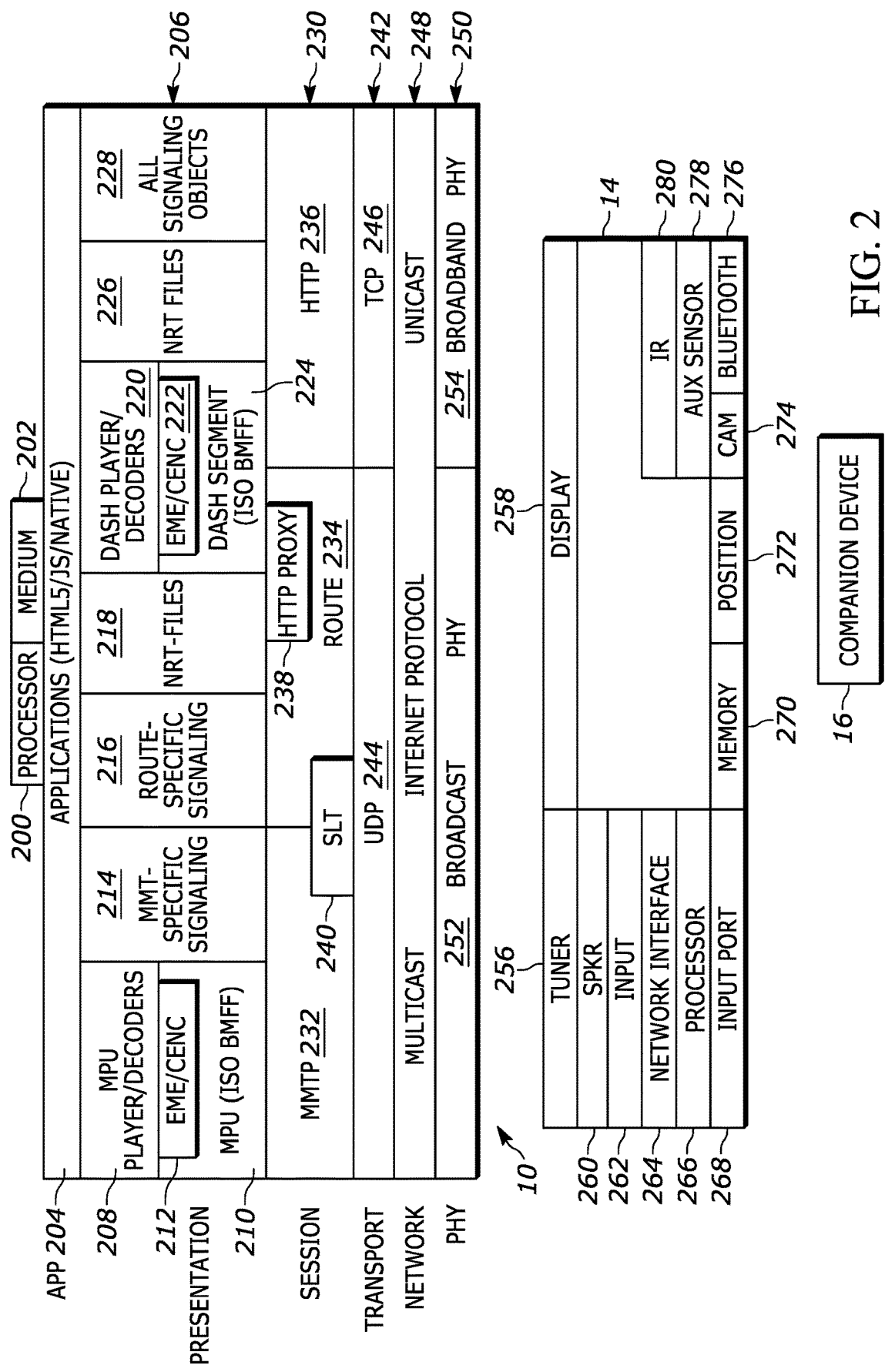
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback functions referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to broadcaster applications or stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S). The broadcast side of the session layer 230 also may employ a HTTP proxy module 238 and a service list table (SLT) 240. The SLT 240 includes a table of signaling information which is used to build a basic service listing and provide discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transport over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/ microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
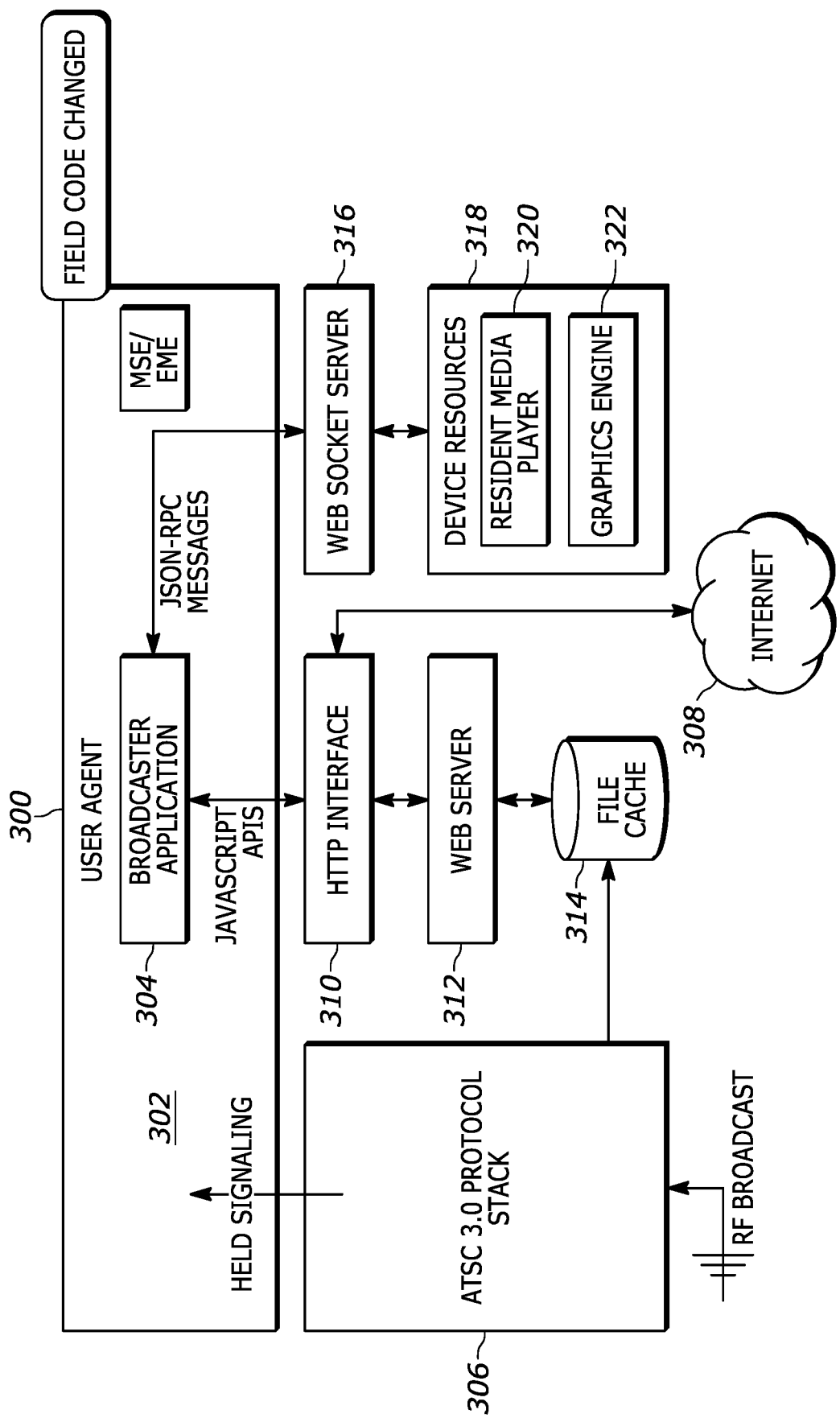
FIG. 3 is a block diagram of a simplified test architecture.

Now referring to FIG. 3, a receiver 300 is shown. For test purposes, the receiver 300 can be regarded as a device under test (DUT). The receiver 300 includes a typically software-implemented user agent 302 that in turn includes a broadcaster application (BA) 304, which may be associated with a single channel or a single subset of channels from the same or related broadcasters. The BA 304 typically supports such ATSC 3.0 functions as replacement content insertion into a broadcast received via an ATSC 3.0 protocol stack 306. Consistent with principles described above, the replacement content may be received from the Internet 308 via an HTTP interface 310, which may also receive information from a web server 312 associated with the broadcaster for example having access to a cache 314 of content files in some cases received from the protocol stack 306. The BA 304 may communicate with the HTTP interface 310 using Javascript application programming interfaces (API).

The BA 304 may further communicate with a web socket server 316 to access device resources 318, which may include a resident media player 320 and a graphics engine 322. Communication between the BA 304 and web socket server 316 may be via Javascript object notation (JSON) remote procedure call (RPC) messages.

The example user agent 302 further may include a media source encryption and/or encrypted media extension (MSE/EME) module 324.

Figure 4:
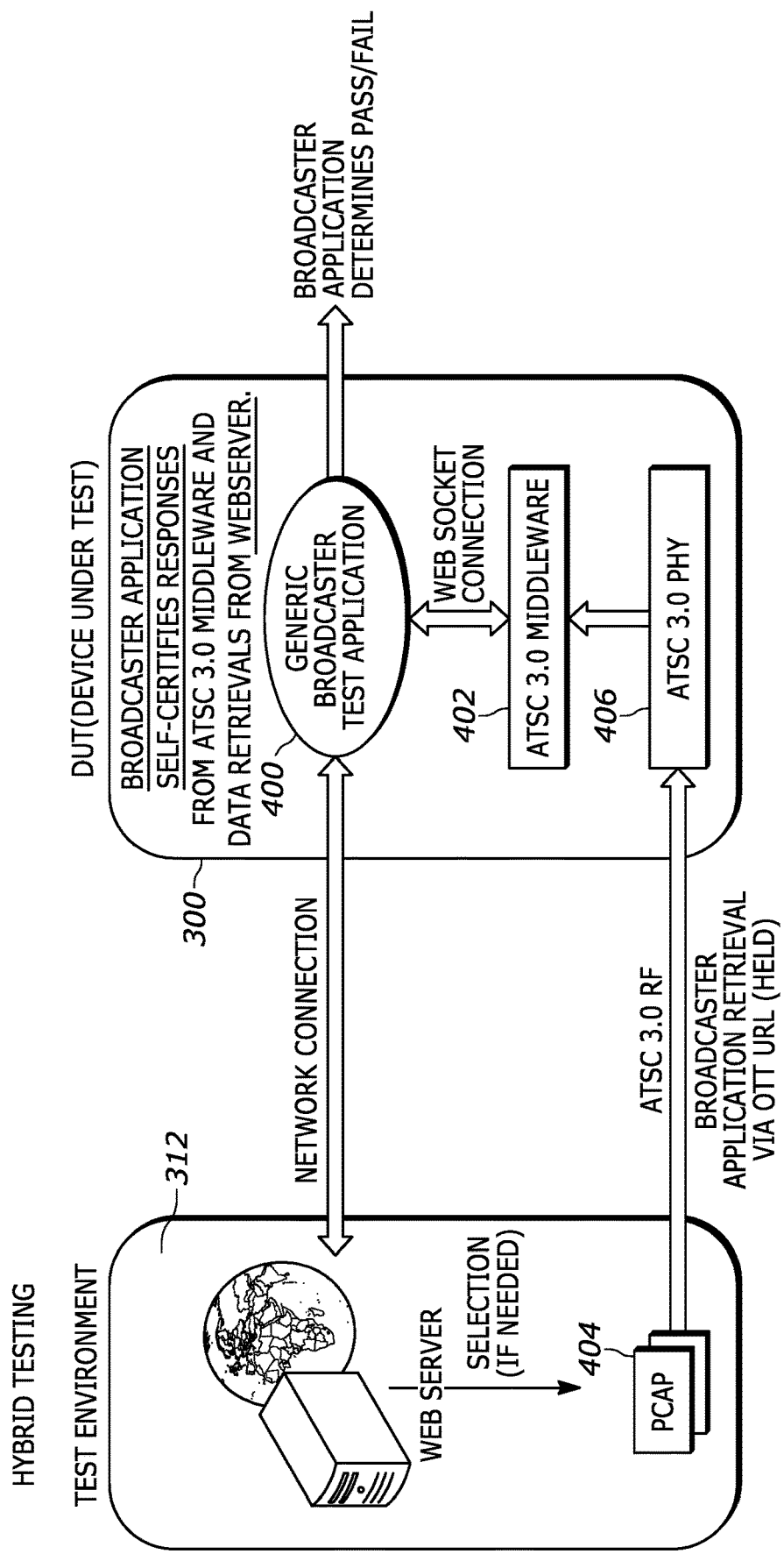
FIG. 4 is a block diagram illustrating verification test techniques.

With the architecture of FIG. 3 in mind, FIG. 4 illustrates a test environment for the DUT 300. Testing hybrid broadcast/broadband connectivity can be facilitated using a generic test BA 400. The test BA 400 is essentially a test application that is configured with BA functionality but that is not provided by a broadcaster but rather by a device manufacturer to run a test script in which the test application 400 self-generates commands to components of the DUT and monitors for correct feedback.

The test application 400 is loaded onto the DUT 300 and essentially self-certifies responses from the ATSC 3.0 middleware 402 in the stack 306 and data retrievals from the web server 312/web socket server 316. The DUT 300 can execute a browser of choice (such as those provided under trademarks/trade names such as Firefox, Safari, Chrome, VEWD, etc.) that can execute HTML5 code. Furthermore, the DUT 300 executes a WebSocket for Application Programming Interface (API) call handling to provide information about the device itself, such as amount of memory is available, what video/audio codecs are available, etc.

The test application 400 can be loaded onto the DUT 300 via a PCAP file, designated by reference numeral 404 in FIG. 4, containing HTML Entry pages Location Description (HELD) signaling as described in ATSC 3.0 standard A/331. More specifically, the test application 400 may be sent through the PCAP file 404 from the web server 312 to the DUT 300 wirelessly, i.e., via ATSC 3.0 broadcast that is received by the ATSC 3.0 physical layer 406 in the stack 306 of the DUT 300 and provided to the middleware 402.

The HELD signaling triggers the DUT 300 to load an entry page (index.html) from, e.g., a web server onto its browser. The test application 400 then executes all API calls to exercise compliance with a given standard (e.g., A/344 or CTA5000).

The test application 400 exercises the connections to WebSocket Server 316, the HTTP interface 310, and reception of the HELD signaling. The WebSocket interface contains the APIs for device resource reporting. The HTTP interface 310 can be tested for status report of so-called "404 Not found" assets or other internet connection errors. Proper User Agent 302 support of the web browser upon reception of the HELD signaling is tested by sending a signal back through the HTTP interface 310 to a test computer that may be implemented in or by the web server 312.

The test environment shown in FIG. 4 includes a Web server such as the web server 312 and a list of PCAP files to execute. In an example non-limiting implementation, the PCAP files can be loaded into a DekTec transmitter (such as an ATSC3Expert) and each one of the files can have a length that spans the duration of a test. In one example, a first test can be for proper HELD signaling as indicated by a 'hello' signal sent back to the test environment via the HTTP interface 310 or a maintained in a text log in the BA 400. These logs can be recorded on the DUT 300 for later download or sent back to the test environment via the HTTP interface 310.

After setup verification, the HTTP interface 310 can be tested by 'phoning home' back to the test environment with a valid connection stream, in some cases using the media access control (MAC) of the DUT 300 or some other unique identifier for test logging.

Further tests can be conducted for proper execution of the APIs of the WebSocket connected to the websocket server 316 and for proper execution of the browser of the DUT 300. In an example, APIs to test may be those listed in the ATSC 3.0 standard A/344 or CTA5000 (both incorporated herein by reference) or other tests that are deemed necessary to comply with NEXTGEN TV compliance.

For interactivity tests including accessing content from a test environment and timing aspects of tests (reply within a certain amount of time), loading of assets and responses from the DUT 300 can be recorded in the test application 400.

Having the test application 400 determine pass/fail for hybrid interactivity allows the testing to be cost effective and accurate. There is only one application 400 that need be loaded on the DUT 300 and the list of tests remain the same. Updates to tests lists involve an update to the single test application. The test application 400 can handle all interfaces and timing aspects of test criteria.

If an RF channel change is part of the tests, then a new PCAP file for the new RF channel should contain the same HELD signaling for the same test application with the same AppContextID so that the DUT can continue testing. This allows interactive services like channel guides to be tested as well.

Figure 5:
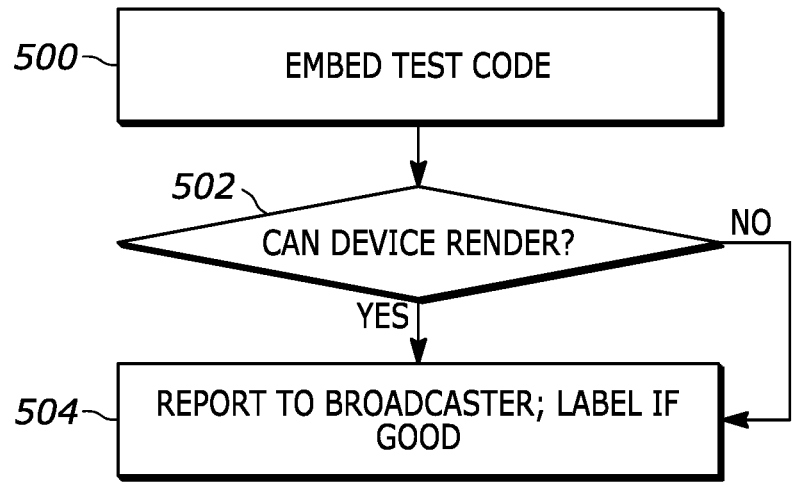
FIGS. 5 and 6 are flow charts of example logic consistent with present principles.
Figure 6:
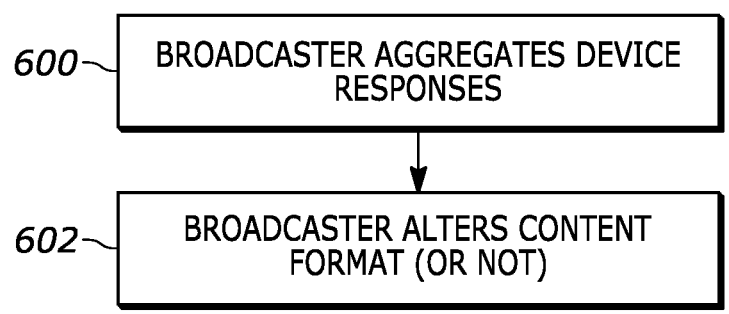

FIGS. 5 and 6 provide further illustration. Commencing at block 500, test code such as any described herein is embedded into signals provided to the DUT 300. For example, the test code may include cascading style sheet (CSS) code to be rendered by the DUT 300. The test code may include a command to change service and the DUT may attempt to execute the command.

Moving to decision diamond 502, using, e.g., the PCAP file the DUT 300 determines whether it has correctly rendered content in the signals/correctly executed applications in the signals. The results are stored in the DUT for later proof of certification and/or provided to the test broadcaster at block 504. If all tests pass the DUT 300 may be physically labeled as a "NextGen TV" receiver.

If desired, the test broadcaster may aggregate test results from plural DUTs at block 600 in FIG. 6. Moving to block 602, depending on the aggregated results the broadcasters may alter content format or not to certain devices and/or device types. For example, if a DUT fails to provide test results on demand as part of a certification process, that device may be locked out of receiving ATSC 3.0 content by, e.g., revoking security keys/certificates of the device.

Note that the above techniques may be used by the manufacturer prior to vending a receiver to ensure compliance, and also by an end user after vending for debugging a receiver that appears to have developed problems. For example, by invoking a help utility the receiver may be caused to automatically connected to the test computer, execute the self-test described above, and then transmit the results to a manufacturer computer for diagnostic use.

It will be appreciated that whilst present principals have been described with reference to some example embodiments, these are not intended to be limiting, and that various alternative arrangements may be used to implement the subject matter claimed herein.

What is claimed is:

1. A digital television system comprising:
at least one receiver configured to receive a digital television signal from at least one transmitter assembly, the receiver comprising:
at least one processor programmed with instructions to:
execute at least a first broadcaster application to access test code in at least a first service;
identify, based at least in part on the test code, whether the receiver renders content; and
transmit a signal to the transmitter assembly indicating whether the receiver renders the content, wherein the test code comprises a command to change service, wherein the command is to change from a first service to a second service, and the instructions are executable to use a first application programming interface (API) in rendering the first service and a second API in rendering the second service.

2. The digital television system of claim 1, comprising the transmitter assembly.

3. The digital television system of claim 1, wherein the digital television system comprises an advanced television systems committee (ATSC) 3.0 system.

4. The digital television system of claim 1, wherein the test code comprises cascading style sheet (CSS) code.

5. A digital television system comprising:
at least one receiver comprising at least one processor programmed with instructions to configure the processor to:
receive a test application;
execute the test application to exercise compliance with a standard, the standard comprising at least one advanced television systems committee (ATSC) standard, the test application exercising compliance with the standard at least in part by executing a first command associated with a first broadcast channel and executing a second command associated with a second broadcast channel to identify execution of a command to change tuning from the first broadcast channel to the second broadcast channel; and provide indication of whether the command to change tuning was properly executed.

6. The digital television system of claim 5, comprising the broadcaster equipment.

7. The digital television system of claim 5, wherein the digital television system comprises an ATSC 3.0 system.

8. The digital television system of claim 5, wherein the instructions are executable to:

implement an application programming interface (API) for logging commands and responses;

execute the test application to exercise at least one connection to at least one WebSocket Server and at least one hypertext transfer protocol (HTTP) interface.

9. The digital television system of claim 8, wherein the instructions are executable to:

execute the test application to test support of a user agent of the receiver for at least one web browser at least on part by sending a signal back through an HTTP interface to a test computer.

10. The digital television system of claim 8, wherein the instructions are executable to:

execute the test application at least in part by sending a 'hello' signal back to the broadcaster equipment.

11. The digital television system of claim 8, wherein the instructions are executable to:

execute the test application at least in part by maintaining in storage of the receiver a 'hello' signal.

12. The digital television system of claim 5, wherein the instructions are executable to:

execute the test application to identify proper execution of APIs of at least one WebSocket of the receiver connected to at least one WebSocket Server.

13. In a digital television system, a method comprising:

executing at least a first broadcaster application (BA) to access test code in at least a first digital television service provided to a receiver, wherein the first BA is configured for executing at least one advanced television systems committee (ATSC) 3.0 function;

identifying, based at least in part on the test code, whether the receiver renders content; and providing an outcome of the identifying to at least one tester.

14. The method of claim 13, wherein the digital television system comprises an ATSC 3.0 system.

15. The method of claim 13, comprising:

responsive to a command to change from a first service to a second service, using a first application programming interface (API) command in rendering the first service and a second API command in rendering the second service.

16. The method of claim 15, comprising:

loading at least one entry page from at least one web server onto at least one browser of the receiver.

17. The method of claim 15, comprising:

executing the first broadcaster application to exercise at least one connection to at least one WebSocket Server, and at least one hypertext transfer protocol (HTTP) interface.

18. The digital television system of claim 1, wherein the first and second services comprise digital television services.

19. The method of claim 13, wherein the first BA is configured for executing at least one ATSC 3.0 function comprising replacement content insertion into a broadcast received via an ATSC 3.0 protocol stack.

20. The method of claim 13, comprising:

wherein the first broadcaster application (BA) comprises a test BA configured with BA functionality but that is not provided by a broadcaster but rather by a manufacturer of the receiver to run a test script in which the test BA self-generates commands to components of the receiver and monitors for correct feedback.

* * * * *